United States Patent
Mital et al.

(10) Patent No.: US 9,111,238 B2
(45) Date of Patent: Aug. 18, 2015

(54) DATA FEED HAVING CUSTOMIZABLE ANALYTIC AND VISUAL BEHAVIOR

(75) Inventors: Vijay Mital, Redmond, WA (US); Max Uritsky, Redmond, WA (US); Suraj Poozhiyil, Redmond, WA (US); Moe Khosravy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 501 days.

(21) Appl. No.: 12/971,685

(22) Filed: Dec. 17, 2010

(65) Prior Publication Data

US 2012/0158644 A1    Jun. 21, 2012

(51) Int. Cl.
G06F 7/00    (2006.01)
G06F 17/30    (2006.01)
G06Q 10/06    (2012.01)

(52) U.S. Cl.
CPC .......... *G06Q 10/06* (2013.01); *G06F 17/30563* (2013.01); *G06F 17/30592* (2013.01)

(58) Field of Classification Search
CPC ..................... G06F 17/30563; G06F 17/30592
USPC .......................................................... 707/602
See application file for complete search history.

(56) References Cited

U.S. PATENT DOCUMENTS

| | | | |
|---|---|---|---|
| 4,633,430 A | | 12/1986 | Cooper |
| 5,669,007 A | * | 9/1997 | Tateishi ........................ 715/210 |
| 6,691,100 B1 | | 2/2004 | Alavi et al. |
| 6,865,720 B1 | | 3/2005 | Otani et al. |
| 6,931,589 B2 | * | 8/2005 | Baltsan et al. ................ 715/255 |
| 7,028,306 B2 | | 4/2006 | Boloker et al. |
| 7,263,663 B2 | | 8/2007 | Ballard et al. |
| 7,315,861 B2 | * | 1/2008 | Seibel et al. ......................... 1/1 |
| 7,343,585 B1 | | 3/2008 | Lau et al. |
| 7,349,947 B1 | | 3/2008 | Slage et al. |
| 7,440,902 B2 | | 10/2008 | Greenstein et al. |
| 7,506,243 B2 | | 3/2009 | Kotler et al. |
| 7,603,620 B2 | | 10/2009 | Erol et al. |
| 7,752,314 B2 | * | 7/2010 | Trevor et al. .................. 709/226 |
| 7,752,536 B2 | | 7/2010 | Megiddo et al. |
| 7,774,791 B1 | * | 8/2010 | Appelbaum et al. .......... 719/318 |
| 7,802,230 B1 | | 9/2010 | Mendicino et al. |
| 7,900,111 B1 | | 3/2011 | Kim et al. |

(Continued)

OTHER PUBLICATIONS

"Windows Azure and Cloud Computing", Retrieved at << http://oakleafblog.blogspot.com/2010/09/windows-azure-and-cloud-computing-posts_09.html >>,Sep. 9, 2010, pp. 1-68.

(Continued)

*Primary Examiner* — Mark E Hershley
(74) *Attorney, Agent, or Firm* — Kevin Sullivan; Kate Drakos; Micky Minhas

(57) ABSTRACT

A data marketplace infrastructure allows a data source company or a third party to associate to a data feed with a customizable preview application having analytic and visual features (e.g., business logic and a user interface). A potential customer can use discovery services of the data marketplace infrastructure to identify one or more data feeds offering sample data in a domain of interest of the potential customer. The data feed can transmit the customizable preview application to allow the potential customer to interact with the data from the data feed before purchasing the data. The potential customer may also customize the preview application so as to change the default application behavior in a manner that improves the potential customer's understanding and appreciation of the data feed.

20 Claims, 9 Drawing Sheets

(56) References Cited

U.S. PATENT DOCUMENTS

| | | | |
|---|---|---|---|
| 7,908,186 B2 | 3/2011 | Gabelmann et al. | |
| 8,135,655 B2* | 3/2012 | Oaten et al. | 706/13 |
| 8,332,772 B2 | 12/2012 | Janzen et al. | |
| 8,473,473 B2 | 6/2013 | Wang et al. | |
| 8,589,172 B2 | 11/2013 | Alonso et al. | |
| 8,635,211 B2 | 1/2014 | Jiang et al. | |
| 2001/0047372 A1 | 11/2001 | Gorelik et al. | |
| 2002/0065673 A1 | 5/2002 | Rooke | |
| 2002/0066782 A1 | 6/2002 | Swaminathan et al. | |
| 2002/0091609 A1 | 7/2002 | Markowski | |
| 2002/0169658 A1* | 11/2002 | Adler | 705/10 |
| 2002/0191199 A1 | 12/2002 | Imada et al. | |
| 2003/0040962 A1* | 2/2003 | Lewis | 705/14 |
| 2003/0041104 A1 | 2/2003 | Wingard et al. | |
| 2003/0144868 A1 | 7/2003 | MacIntyre et al. | |
| 2004/0015481 A1* | 1/2004 | Zinda | 707/1 |
| 2004/0098358 A1 | 5/2004 | Roediger | |
| 2004/0153992 A1 | 8/2004 | Molina-Moreno et al. | |
| 2004/0162842 A1 | 8/2004 | Ono et al. | |
| 2004/0181519 A1 | 9/2004 | Anwar | |
| 2005/0004911 A1 | 1/2005 | Goldberg et al. | |
| 2005/0043961 A1 | 2/2005 | Torres et al. | |
| 2005/0187809 A1 | 8/2005 | Falkenhainer | |
| 2005/0231392 A1 | 10/2005 | Meehan et al. | |
| 2006/0074882 A1* | 4/2006 | Scherer et al. | 707/3 |
| 2006/0080400 A1* | 4/2006 | Guha | 709/216 |
| 2007/0038657 A1 | 2/2007 | Denton et al. | |
| 2007/0046664 A1 | 3/2007 | Raspl et al. | |
| 2007/0061711 A1 | 3/2007 | Bodin et al. | |
| 2007/0112714 A1* | 5/2007 | Fairweather | 706/46 |
| 2007/0118394 A1* | 5/2007 | Cahoon | 705/1 |
| 2007/0124285 A1* | 5/2007 | Wright et al. | 707/3 |
| 2007/0136326 A1 | 6/2007 | Mcclement et al. | |
| 2007/0179941 A1 | 8/2007 | Huang et al. | |
| 2007/0185746 A1* | 8/2007 | Chieu et al. | 705/7 |
| 2007/0250764 A1 | 10/2007 | Jiang et al. | |
| 2007/0265995 A1 | 11/2007 | Remington et al. | |
| 2007/0294614 A1 | 12/2007 | Jacquin et al. | |
| 2008/0040346 A1 | 2/2008 | Aggarwal et al. | |
| 2008/0058969 A1 | 3/2008 | Nixon et al. | |
| 2008/0178083 A1 | 7/2008 | Bergman et al. | |
| 2008/0183710 A1 | 7/2008 | Serjeantson et al. | |
| 2008/0184140 A1 | 7/2008 | Koerner | |
| 2008/0189438 A1 | 8/2008 | Zimmerer et al. | |
| 2008/0195930 A1 | 8/2008 | Tolle | |
| 2008/0209314 A1* | 8/2008 | Sylthe et al. | 715/273 |
| 2008/0215559 A1 | 9/2008 | Fontoura et al. | |
| 2008/0238925 A1 | 10/2008 | Meehan et al. | |
| 2008/0271127 A1 | 10/2008 | Naibo et al. | |
| 2008/0288889 A1* | 11/2008 | Hunt et al. | 715/810 |
| 2008/0294996 A1* | 11/2008 | Hunt et al. | 715/739 |
| 2008/0306981 A1 | 12/2008 | Jiang et al. | |
| 2008/0307334 A1* | 12/2008 | Chaudhri et al. | 715/764 |
| 2008/0319829 A1* | 12/2008 | Hunt et al. | 705/10 |
| 2009/0037363 A1 | 2/2009 | Kozlov et al. | |
| 2009/0049422 A1 | 2/2009 | Hage et al. | |
| 2009/0094674 A1* | 4/2009 | Schwartz et al. | 726/1 |
| 2009/0100360 A1 | 4/2009 | Janzen et al. | |
| 2009/0100407 A1 | 4/2009 | Bouillet et al. | |
| 2009/0125553 A1* | 5/2009 | Dickinson | 707/104.1 |
| 2009/0138415 A1* | 5/2009 | Lancaster | 706/11 |
| 2009/0172024 A1 | 7/2009 | Hsu et al. | |
| 2009/0172773 A1 | 7/2009 | Moore | |
| 2009/0216758 A1 | 8/2009 | Tuttle et al. | |
| 2009/0225082 A1* | 9/2009 | Hargrove et al. | 345/440 |
| 2009/0254971 A1* | 10/2009 | Herz et al. | 726/1 |
| 2009/0287814 A1 | 11/2009 | Robertson et al. | |
| 2009/0300544 A1 | 12/2009 | Psenka et al. | |
| 2009/0312992 A1 | 12/2009 | Chen et al. | |
| 2009/0322739 A1 | 12/2009 | Rubin et al. | |
| 2009/0327878 A1 | 12/2009 | Grandison et al. | |
| 2010/0070448 A1* | 3/2010 | Omoigui | 706/47 |
| 2010/0088258 A1* | 4/2010 | Oaten et al. | 706/13 |
| 2010/0100561 A1* | 4/2010 | Cooper et al. | 707/769 |
| 2010/0106853 A1 | 4/2010 | Kashiyama et al. | |
| 2010/0131255 A1 | 5/2010 | Beckman et al. | |
| 2010/0131293 A1* | 5/2010 | Linthicum et al. | 705/3 |
| 2010/0138231 A1* | 6/2010 | Linthicum et al. | 705/2 |
| 2010/0145902 A1* | 6/2010 | Boyan et al. | 706/54 |
| 2010/0179951 A1 | 7/2010 | Mcphail | |
| 2010/0198697 A1* | 8/2010 | Brown et al. | 705/14.73 |
| 2010/0205178 A1 | 8/2010 | Bush et al. | |
| 2010/0241620 A1 | 9/2010 | Manister et al. | |
| 2010/0287459 A1 | 11/2010 | Mital et al. | |
| 2011/0029636 A1 | 2/2011 | Smyth et al. | |
| 2011/0072000 A1* | 3/2011 | Haas et al. | 707/709 |
| 2011/0072001 A1* | 3/2011 | Basu et al. | 707/709 |
| 2011/0072046 A1* | 3/2011 | Chi | 707/773 |
| 2011/0093430 A1* | 4/2011 | B'Far et al. | 706/55 |
| 2011/0131253 A1 | 6/2011 | Peukert et al. | |
| 2011/0179020 A1 | 7/2011 | Ozzie et al. | |
| 2011/0231385 A1 | 9/2011 | Wang et al. | |
| 2011/0295795 A1 | 12/2011 | Venkatasubramanian et al. | |
| 2011/0295853 A1 | 12/2011 | Li et al. | |
| 2012/0158643 A1 | 6/2012 | Mital et al. | |
| 2012/0158732 A1 | 6/2012 | Mital et al. | |
| 2012/0158754 A1 | 6/2012 | Mital et al. | |
| 2012/0159312 A1 | 6/2012 | Mital et al. | |
| 2012/0159333 A1 | 6/2012 | Mital et al. | |
| 2012/0159465 A1 | 6/2012 | Mital et al. | |

OTHER PUBLICATIONS

Delaney, Andrew, "Direct Data Feed Services", Retrieved at << http://www.a-teamgroup.com/?dl_id=7460&dl_cm=on&dl_la=0&dl_Is=0 >>, Jun. 2010, pp. 8.

McNee et al., "Creating Auction Ads for Marketplaces", Retrieved at << http://e-articles.info/e/a/title/Creating-Auction-Ads-for-Marketplaces/ >>, Apr. 2007, pp. 1-2.

Biddick, Michael, "Six Questions to Ask Before Buying End-To-End APM", Retrieved at << http://www.networkcomputing.com/end-to-end-apm/6-questions-to-ask-before-buying-end-to-end-apm.php >>,Jun. 21, 2010, pp. 1-9.

"Document Processing System"—Published Date: Nov. 16, 2007; http://www.wolfram.com/products/mathematica/analysis/content/DocumentProcessingSystems.html.

"How to Customize Ubuntu into your own custom distribution," Retrieved at <<http://www.linuxquestions.org/questions/ubuntu-63/how-to-customize-ubuntu-into-your-own-custom-distribution-663412/>>, Aug. 17, 2008, 10 pages.

"Introduction to the XML Pipeline Definition Language (XPL)"—Retrieved Date: Sep. 15, 2010; http://www.orbeon.com/orbeon/doc/reference-xpl-pipelines.

"LeoStatistic—building histogram, curve fit, multivariate regression, data modeling software," Retrieved at <<http://www.leokrut.com/leostatistic.html>> Retrieved Date Sep. 21, 2010, pp. 1-6.

"Optimizing forms processing"—Retrieved Date: Sep. 15, 2010; http://www.movetonow.com/content/optimizing_forms_processing.

"Publishing applications to market place," Retrieved at <<https://help.creator.zoho.com/Publishing-applications-to-market-place.html>>, Retrieved Date Nov. 26, 2010, pp. 1-5.

"Quella Business Intelligence Package," Retrieved at <<http://www.shareit.com/product.html?cookies=1&productid=300100398&affiliateid=2000122751>>, 1 page.

"Square your search results with Google Squared," Retrieved at <<http://googleblog.blogspot.com/2009/06/square-your-search-results-with-google.html>>, Jun. 2009, pp. 1-4.

"User Customization," Retrieved at <<http://docstore.mik.ua/orelly/perl3/tk/ch16_01.htm>>, Retrieved Date Nov. 26, 2010, pp. 1-4.

Ayachit et al., "Customizing ParaView," Retrieved at <<http://www.itk.org/Wiki/images/7/77/Branding_paper.pdf>>, Oct. 2009, 3 pages.

Banerjee, Atanu, "The 2007 Microsoft Office System and Other Platform Technologies for Building Composite Applications," Retrieved at <<http://msdn.microsoft.com/en-us/library/bb220802.aspx>>, Dec. 2006, 14 pages.

Collins, J., "Using Innovation in Technology to Create New Business Models," Retrieved at <<http://www.theshiftonline.com/?p=666>>, Oct. 25, 2010, 3 pages.

(56) References Cited

OTHER PUBLICATIONS

Frisch, A. et al. "Streaming XML transformations using term rewriting"—Published Date: 2007; http://pauillac.inria.fr/~frisch/xstream/long.pdf.
Gardarin, G. et al. "XML-based Components for Federating Multiple Heterogeneous Data Sources" Lecture Notes in Computer Science—Published Date: 1999; http://dntt.free.fr/publi/er1999.pdf.
Janeiro, et al., "Improving the Development of Service-Based Applications Through Service Annotations," Retrieved at <<http://www.rn.inf.tu-dresden.de/uploads/Publikationen/AnnotationPaperWWW-Internet2009.pdf>>, 2009, 8 pages.
Jelinek, J. et al. "XML Visualization Using Tree Rewriting"—Published Date: 2004; http://mummy.intranet.gr/includes/docs/Conferences/_02_XMLvisualization-Jelinek-SCCG04.pdf.
Johnson, et al., "Building ETL Processes for Business Intelligence Solutions," Retrieved at <<http://www.ca.com/files/whitepapers/ca-erwin-building-etl-processes-sql-wp-us-en.pdf>>, Jul. 10, 2008, 6 pages.
Mostarda et al., "MU: an hybrid language for Web Mashups," Retrieved at <<http://em-up.googlecode.com/svn/wiki/papers/www2009.pdf>>, 2009, 10 pages.
Nagel, Nick, "Enterprise Data Modeling Using XML Schema," Retrieved at <<http://citeseerx.ist.psu.edu/viewdoc/download?doi=10.1.1.135.6120&rep=rep1&type=pdf>>, 2007, 30 pages.
Page, S. "XSL Pipeline Processing"—Published Date: Jul. 2, 2007; http://www.usingxml.com/Transforms/XslPipelines.
Ravindran, Karthik, "Integrating LOB Systems with the Microsoft Office System," Retrieved at <<http://msdn.microsoft.com/en-us/library/bb896607.aspx>>, Nov. 2007, pp. 1-18.
Spillner et al., "Flexible Human Service Interfaces," Retrieved at <<http://citeseerx.ist.psu.edu/viewdoc/download?doi=10.1.1.70.7734&rep=rep1&type=pdf>>, 2007, 7 pages.
White, Colin J., "IBM enterprise analytics for the intelligent e-business," Retrieved at <<http://sysdoc.doors.ch/IBM/bi.pdf>>, Sep. 2001, 34 pages.
"Non-final Office Action Issued in U.S. Appl. No. 12/971,638", Mailed Date: Aug. 30, 2012, Filed Date: Dec. 17, 2010, 18 Pages.
"Non-final Office Action Issued in U.S. Appl. No. 12/971,725", Mailed Date: Aug. 21, 2012, Filed Date: Dec. 17, 2010, 10 Pages.
"Final Office Action Issued in U.S. Appl. No. 12/971,725", Mailed Date: May 1, 2013, Filed Date: Dec. 17, 2010, 14 Pages.
"Non-final Office Action Issued in U.S. Appl. No. 12/971,782", Mailed Date: Jul. 13, 2012, Filed Date: Dec. 17, 2010, 7 Pages.
"Final Office Action Issued in U.S. Appl. No. 12/971,782", Mailed Date: Jan. 31, 2013, Filed Date: Dec. 17, 2010, 10 Pages.
"Final Office Action Issued in U.S. Appl. No. 12/971,462", Mailed Date: Sep. 18, 2013, Filed Date: Dec. 17, 2010, 24 Pages.
"Non-final Office Action Issued in U.S. Appl. No. 12/971,462", Mailed Date: Mar. 21, 2013, Filed Date: Dec. 17, 2010, 21 Pages.
"Non-Final Office Action Issued in U.S. Appl. No. 12/972,205", Mailed Date: Nov. 26, 2012, Filed Date: Dec. 17, 2010, 32 Pages.
"Final Office Action Issued in U.S. Appl. No. 12/972,205", Mailed Date: Jun. 7, 2013, Filed Date: Dec. 17, 2010, 35 Pages.
"Final Office Action Issued in U.S. Appl. No. 12/971,638", Mailed Date: Feb. 25, 2014, Filed Date: Dec. 17, 2010, 11 Pages.
"Non-final Office Action Issued in U.S. Appl. No. 12/971,725", Mailed Date: Jun. 23, 2014, Filed Date: Dec. 17, 2010, 18 Pages.
"Non-final Office Action Issued in U.S. Appl. No. 12/971,782", Mailed Date: Apr. 10, 2014, Filed Date: Dec. 17, 2010, 10 Pages.
"Non-Final Office Action Issued in U.S. Appl. No. 12/972,249", Mailed Date: Jul. 31, 2014, Filed Date: Dec. 17, 2010, 30 Pages.

* cited by examiner

DATA FEED HAVING CUSTOMIZABLE ANALYTIC AND VISUAL BEHAVIOR

CROSS-REFERENCE TO RELATED APPLICATIONS

The present application is related to U.S. patent application Nos. entitled "Business Intelligence Document" application Ser. No. 12/971,462, Publication Number 2012/0159465; entitled "Data Mining within a Business Intelligence Document" application Ser. No. 12/971,638, Publication Number 2012/0158643; entitled "Automated Generation of Analytic and Visual Behavior" application Ser. No. 12/971,725, Publication Number 2012/0158754; entitled "Decision Application Publication" application Ser. No. 12/971,782, Publication Number 2012/0158732; entitled "Representation of an Interactive Document as a Graph of Entities" application Ser. No. 12/972,205, Publication Number 2012/0159312; and entitled "Representation of an Interactive Document as a Graph of Entities" application Ser. No. 12/972,249, Publication Number 2012/0159333, all filed concurrently herewith and all of which are specifically incorporated by reference herein for all that they disclose or teach.

BACKGROUND

Business intelligence (BI) refers to a broad category of applications and technologies for gathering, storing, analyzing, and providing access to data to help information workers (IWs) make better business decisions. BI applications typically address activities such as decision support systems, querying, reporting, online analytical processing (OLAP), statistical analysis, forecasting, and data mining. A variety of data sources may be accessed to provide input data relevant to the objectives of each BI application.

Discovering the data sources capable of providing this relevant input data can be difficult and time-consuming. First, a developer typically visits Web sites of numerous data source companies to determine which of them, if any, offer the relevant data in a package and at a price that meets the developer's needs. Second, upon identifying the appropriate data sources and data offered thereby, the developer purchases the data via separate transactions with each data source company. Third, the companies may deliver the purchased data to the developer in different formats, e.g., via Web service, Microsoft EXCEL® spreadsheet, a DVD of CSV data, XML data, RSS feeds, etc.

Furthermore, the step of determining whether a data source company offers the relevant data is particularly challenging. While a data source company may offer a directory of data feeds and display samples of the data to the developer (e.g., in a chart), such companies do not typically allow a developer to interact with a particular data feed, especially in combination with his or her own data and business logic, until he or she pays for the access. As such, the customer is unable to do a trial run with the data feed to make sure it provides the right data for a desired objective.

SUMMARY

Implementations described and claimed herein address the foregoing problems by providing a data marketplace infrastructure that allows a data source company or a third party to associate a data feed to a customizable preview application having analytic and visual features (e.g., business logic and a user interface). A potential customer can use discovery services of the data marketplace infrastructure to identify one or more data feeds offering data in a domain of interest of the potential customer. The data feed can transmit the customizable preview application to allow the potential customer to interact with the sample data from the data feed before purchasing the data. The potential customer may also customize the preview application so as to change the default application behavior in a manner that improves the potential customer's understanding and appreciation of the data feed.

In some implementations, articles of manufacture are provided as computer program products. One implementation of a computer program product provides a computer program storage medium readable by a computer system and encoding a computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

A data marketplace in the described technology represents a cloud-based service or an on-premises/off-premises service that provides a marketplace for information, such as data, web services, and analytics. Content providers can use a data marketplace to make their datasets available to a wide online audience. Developers can write code on any platform to consume datasets received from a data marketplace. Subscribers can use a data marketplace to find datasets that address their needs through rich discovery features and purchase access to such datasets through a consistent transaction and billing framework. Example billing scenarios may include without limitation pay-as-you-go transactions, monthly subscriptions, enterprise volume licensing, pure virtual billing, etc. In one implementation, a data marketplace provides a subscriber with a data feed sourcing data with a consistent presentation and an ability to automatically generate new proxy classes (e.g., to make the communications between the data feed and a data consumer transparent).

Figure 1:
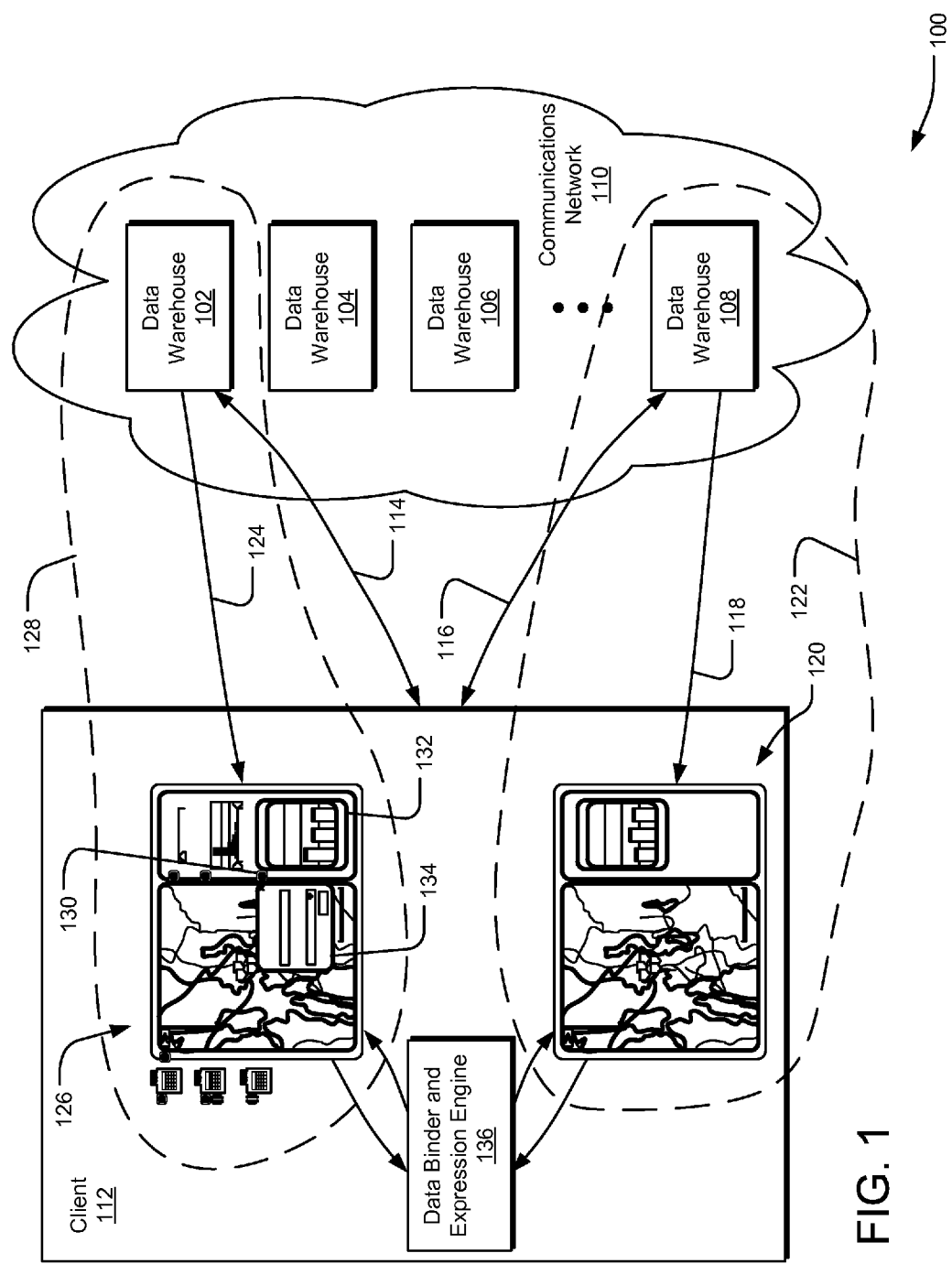
FIG. 1 illustrates an example data marketplace environment.

FIG. 1 illustrates an example data marketplace environment 100. The cloud-computing paradigm provides Web-based processing in which shared resources, software, and information are provided to computing devices (e.g., servers, client systems, mobile devices) on demand over a communications network, such as the Internet. The data marketplace concept provides a significant evolution in discovery, subscription, access, and publishing of data (e.g., both public and commercial) and associated business logic and user interfaces within the "cloud."

In FIG. 1, data warehouses 102, 104, 106, and 108 reside on a communications network 110. Each data warehouse stores and organizes data for access by authorized systems, such as BI clients executing BI applications on the data obtained from the data warehouse. Generally, each data warehouse represents a network-based data source, typically including one or more servers and/or data storage systems. With appropriate authorization, other computing systems can connect with such data sources via the Web to access select data, services, and other resources. Web services represent another example network-based data source. Typically, data feeds made available by a data source are organized in a browse-able directory, from which a data feed of interest may be selected by the prospective subscriber. The described technology enhances discovery of such data feeds and provides a preview application to allow a prospective subscriber to "try out" the data before paying for it.

In one implementation, a BI document defines the BI application using a data structure of arbitrary expressions that can be specified by a non-programmer. In one implementation, a BI application defined by sets of such arbitrary expressions are grouped into distinct entities, which may have input variables and output variables, wherein the relationships among inputs and outputs of these entities defined by the sets of expressions that define the entities. The expressions are generally not unique to any particular system but may be evaluated by either a local or remote system. However, an entity (and therefore the contained expressions) may be designated for local or remote computation on local or remote data, thereby directing computation to an appropriate system based on this designation.

Individual entities may be connected into a pipeline of entities, such that an output of one entity (e.g., an external equation set entity for remote computation) is connected to the input of another entity (e.g., an internal equation set entity of local computation), and so on. The input and output formats of connected entities are matched, such that the data output by one entity is compatible with the input format (e.g., schema) required by the entity to which that data is input. The pipeline-connection of multiple entities allows a user to specify a BI application for evaluating complex and arbitrary combinations of expressions using local or remote data and computation to obtain sophisticated BI solutions.

Furthermore, a non-programmer can develop a BI application defined by such expressions. In some implementations, the skill level adequate for a person to develop a BI application defined by expressions may be similar to the skill level adequate to use a spreadsheet software application, such as Microsoft EXCEL®.

An expression is a symbolic representation of a computation to be performed and may include operators and operands. Example operators of an expression may include without limitation mathematical operators (e.g., addition, subtraction, etc.), relational transformations (e.g., group, ungroup, join, filter, sort, etc.), aggregate transformations over nested structures (e.g., hierarchical filtering), classifiers (e.g., Bayesian algorithm that classified an unstructured set of data), BI aggregations and transformations, and arbitrary or customized transform expressions (e.g., sets of rules, equations, and/or constraints). Example operands of an expression may include without limitation data (e.g., numbers or strings), hierarchical data (such as records, tuples, and sequences), symbols that represent data, and other expressions that resolve to specific data. An expression may thus be recursive in that an expression may be defined by other expressions.

For example, an expression may take the form of a symbolic representation of an algebraic expression, such as $x^2+2xy+y^2$, where x and y are symbols that represent data or other expressions. A symbol may represent any type of data, including without limitation an integer, a rational number, a string, a Boolean, a sequence of data (potentially infinite), a tuple, or a record. In some implementations, a symbol may also represent an irrational number, although in other implementation, a symbol may be prohibited from representing an irrational number. Any expression may take the form of an equation, such as $E=mc^2$, where E, m, and c are symbols representing data or other expressions. An expression may also take the form of a functional definition, such as $f(x)=x^2-1$, where f is a symbol representing the function, x is a symbol representing an operand or argument of the function, and $x^2-1$ is an expression that defines the function. In addition, an expression may take the form of a function invocation, such as $f(3)$, which indicates that the function $f$ is to be invoked with an argument of "3".

An expression may be solved by an expression engine (see expression engine 216 in FIG. 2) to produce a result (e.g., a solution or output). For example, where the symbol x (which is itself an expression) represents the number "3" and the symbol y (which is also an expression) represents the number "2," the expression $x^2+2xy+y^2$ may be solved by replacing the symbols with the values they represent, e.g., $2^2+2\cdot2\cdot3+3^2$, and then applying the operators to the operands to solve the entire expression to equal "25." In another example, where m is a symbol representing the number "2" and c is a symbol representing the number "2," the expression E, defined above, may be solved by replacing E with its definition (e.g., $mc^2$), replacing the symbols m and c with the values they represent (e.g., $2\cdot3^2$) and applying the operators to the operands to solve the expression to equal "18."

In evaluating an expression, the expression engine may apply the operators to the operands to the extent that the operators and operands are defined and to the extent that the expression engine is configured to apply the operators to the operands. For example, where the symbol x represents the number "3" and the symbol "y" is not yet defined, the expression $x^2+2xy+y^2$ may be solved by replacing the known symbol "x" with the value it represents (e.g., $2^2+2\cdot2\cdot y+y^2$) and then applying the operators to the operands to solve the entire expression as $4+4y+y^2$. Where the symbol x represents the number "3" and the symbol y represents the string "hello", the expression $x^2+2xy+y^2$ may be solved as $4+4\cdot hello+hello^2$, since the expression engine may not be configured to perform arithmetic operations on the string "hello".

Each expression can further specify a data source, whether local or remote. For example, an expression in which data values for x are taken from a local data source and data values for y are taken from a remote data source may be declared as follows:

$|x^2+2xy+y^2|$ where x in local_table_contacts·Age and y in remote_table_contacts·Income Furthermore, each expression can further designate local or remote computation. For example, the computation entity may be specifically identified for an expression as such:

$x^2+2xy+y^2|$local source·Solver or $x^2+2xy+y^2|$remote source·Solver

In some implementations, expressions without a computation identifier are deemed local by default.

In some implementations, expression may be declarative. A declarative expression can identify a computation to be performed without specifying how to compute it. A declarative expression may be contrasted with an imperative expression, which may provide an algorithm or other specification for computing the expression. Declarative expressions may be input manually, such as into a field in a spreadsheet tool, or created through a declaration-generating control, such as a visual control element associated with a visualization.

In some implementations, expressions may be immutable. An expression is immutable if it cannot be changed. For example, once a definition is given to an immutable expression, such as if $E=mc^2$ is designated immutable, the expression E cannot later be given a different definition. One advantage of immutability is that a BI application having one or more expressions designated as immutable prevents users of the BI application from altering those expressions. Where expressions are being solved in a distributed execution environment, immutability may be advantageous in that devices can rely on the immutable expression having the same definition throughout the lifetime of the expression. Immutability of expressions can make it easier for independent parts of a BI application to execute in parallel.

As discussed, a BI application may be defined by a data structure of expressions. In one implementation, the BI application is represented by a graph of nodes or entities specified in the BI document, wherein one or more expressions are partitioned into individual entities and connected via related inputs and outputs. Based on the BI document, the BI application can provide spreadsheet-like, incremental recalculation behavior ("recalc"), solving expressions as the data upon which they depend changes. In addition, the BI tool and the BI document are coordinated to allow BI and other operations over heterogeneous complex data, including data sourced from local and remote data sources.

In one implementation, declarative expressions are recorded in the BI document to define one or more entities in the graph, each entity representing without limitation a data structure, an external data source, a control element, an external event source, a visualization, or an update service. In one implementation, each entity transforms its inputs (if any) into its outputs (if any) and is associated with:

zero or more inputs from other entities, each input configured to accept data from outputs of other entities;

transform expressions that take a set of inputs and create a collection; and zero or more outputs accessible by other entities, each output configured to emit output data generated by the entities transforms.

Figure 3:
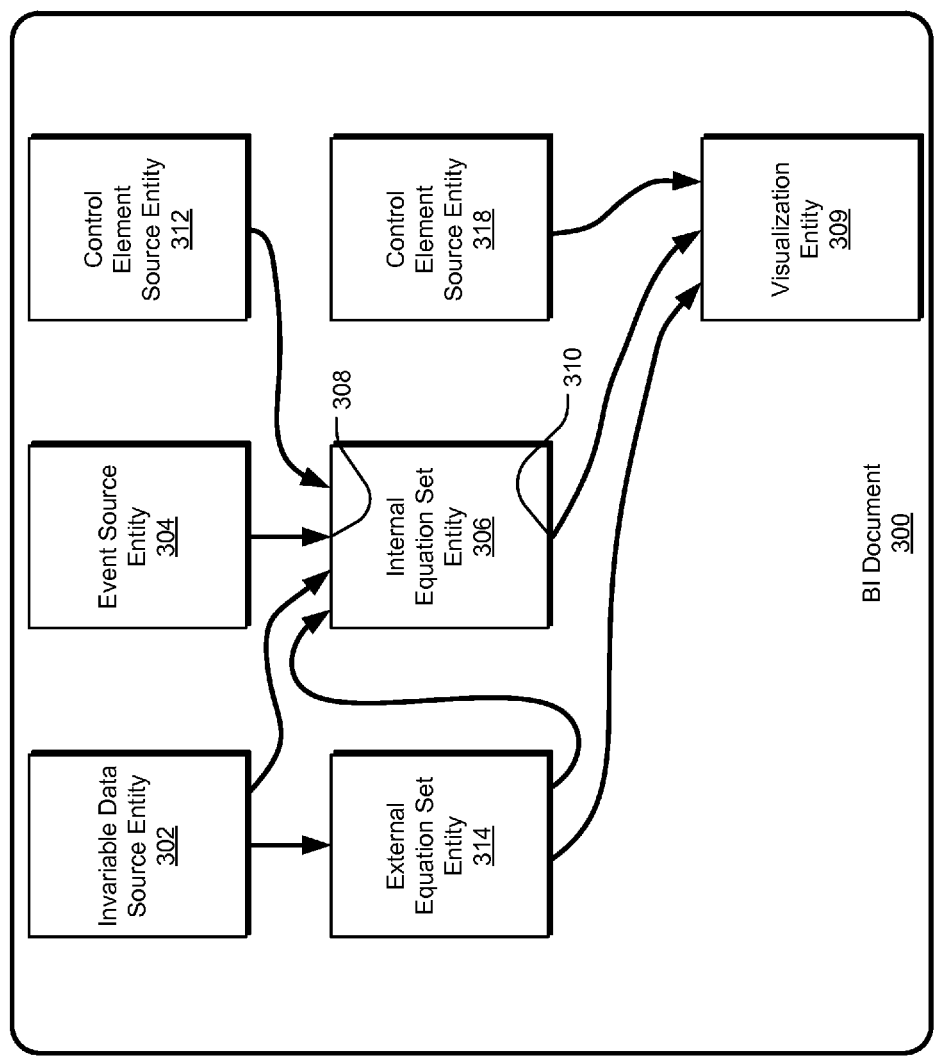
FIG. 3 illustrates an example BI document specifying a graph of connected entities (e.g., transformation nodes).

More details pertaining to entities are described with regard to FIG. 3.

A client 112 (e.g., a client computer system) initially discovers a data feed for possible subscription (e.g., via communications 114 and 116) using a variety of mechanisms. In one implementation, the client 112 provides an identifier (e.g., a URI) of the data warehouse 102 and more specifically, of the specific data feed of interest. In another example, the data warehouse 108 generates and maintains a search index of text residing in expression of the business logic and user interface features of a data feed, wherein the client 112 can submit search queries to search on the text or patterns thereof in order to discover one or more data feeds of interest offered by the data warehouse 108. If the expressions associated with a data feed satisfy the search queries (e.g., as provided in a discovery request), then the data feed can be returned in discovery results to the client 112. A user can then select a data feed from the discovery results to receive a preview applications associated with the selected data feed. In this manner, the data warehouse 108 assists the client 112 in identifying a data feed that may be relevant to a particular business intelligence objective. It should be understood that a web service or other application may be employed to distribute search queries to multiple data sources and to aggregate search results from across the multiple data sources. Other discovery mechanisms for identifying a data feed of interest may also be employed.

In one example, the data warehouse 108 offers a data feed 118, which the client 112 selects (e.g., from a set of search results, from a directory of data feeds, via a provided identifier, etc.). The client 112 can also select to receive a preview application 120 associated with the data feed (e.g., as represented by a sample visualization and underlying business logic and data). The preview application, including any sample data, business logic and user interfaces associated therewith, is specific to the selected data feed, as represented by the dashed line 122 encompassing the preview application 120 and the data warehouse 108. Expressions of the preview application 120 are evaluated at the client 112, providing the client 112 with an interactive preview of sample data, business logic, and user interfaces.

In another example, the data warehouse 102 offers a data feed 124, which the client 112 selects for preview via a preview application 126 of the data feed. The preview application 126, including any business logic and user interfaces associated therewith, is specific to the selected data feed, as represented by the dashed line 128 encompassing the preview and the data warehouse 102. Expressions of the preview application 126 are evaluated at the client 112, providing the client 112 as an interactive preview of some sample data, business logic, and user interfaces. Furthermore, in contrast to the preview application 120 associated with the data feed of the data warehouse 108, the preview application 126 associated with the data feed for data warehouse 102 is shown with customization icons (e.g., icon 130), which allow the client 112 to customize an associated visualization. For example, the customization icon 130 provides editable access to underlying data, business logic and user interfaces associated with a visualization 132, allowing customization (e.g., the altering of business logic expressions) by virtue of a control element 134. The client 112 can therefore manipulate the control element 134 to alter the sample data, business logic, and user interfaces received from the data warehouse 102 in the preview application 126.

A runtime component (e.g., data binder and expression engine 136) evaluates preview applications 120 and 126, including the sample data and expressions representing sample business logic and user interfaces. In this manner, a user at the client 112 can view the preview, including manipulating the present control elements (e.g., a slider control) and, for some preview applications, customize the underlying data, business logic and user interfaces. Furthermore, the client 112 can save the state of such customizations and save them locally or return them to the associated data warehouse.

Furthermore, in one implementation, the expressions and data of the preview application can be in the form of textual data, which can be transferred from the preview application to another BI application at the client (e.g., via copy or cut, and paste logic or drag and drop logic). In this manner, a user can easily use preview applications to develop their own BI applications.

Figure 2:
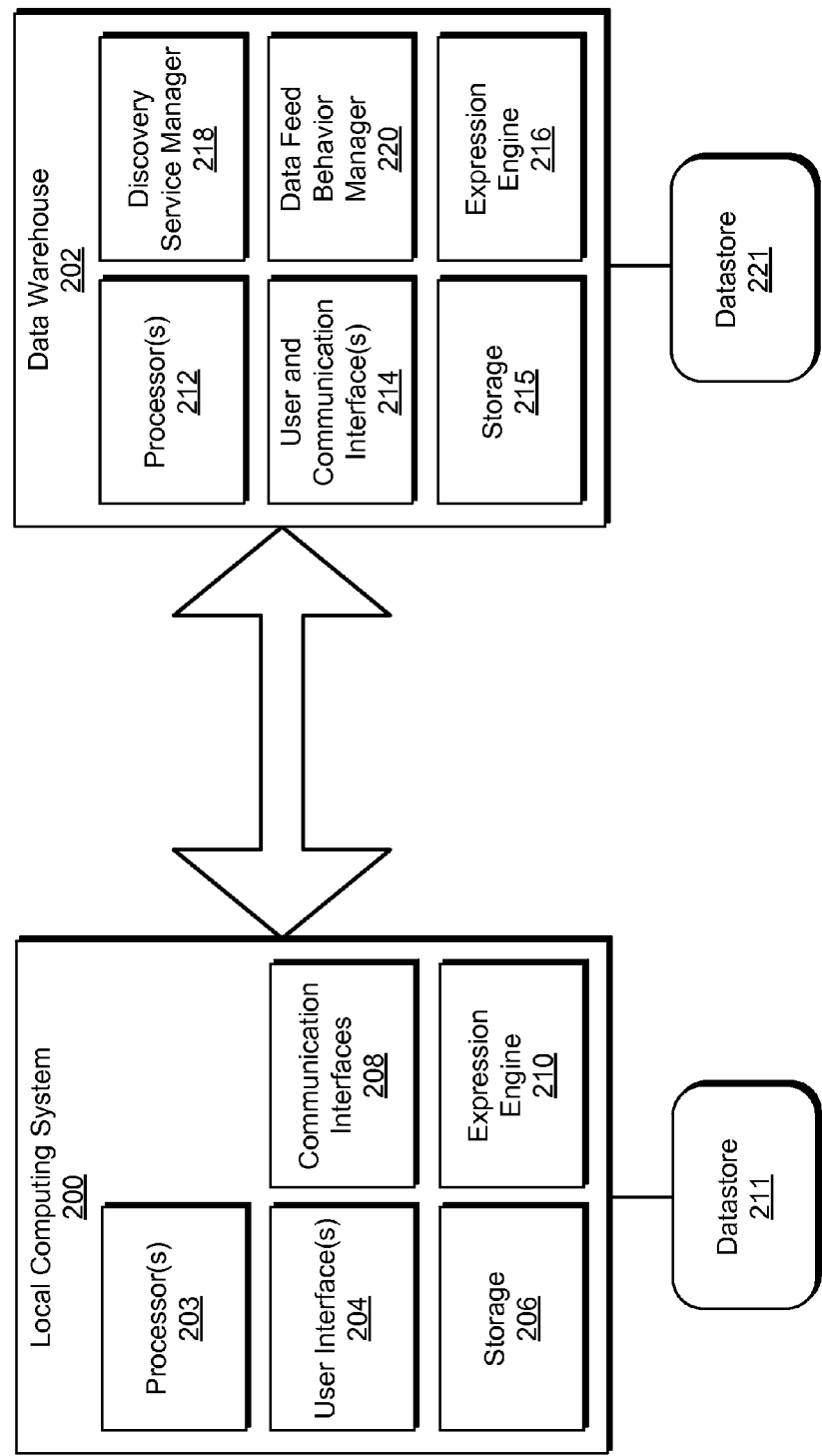
FIG. 2 illustrates components of an example local computing system interacting with components of an example data warehouse in a data marketplace environment.

FIG. 2 illustrates components of an example local computing system 200 interacting with components of an example data warehouse 202 in a data marketplace environment. The local computing system 200 includes one or more processors 203, one or more user interfaces 204 (e.g., a display interface, keyboard/mouse interface, touch screen interface, etc.), and local storage 206 (e.g., local RAM or flash memory, magnetic storage, a solid state drive, etc.), and one or more communication interfaces 208 (e.g., a wireless or wired network interface). In addition, the local computing system 200 includes one or more local runtime components (e.g., expression engine 210) for evaluating expressions and data received in a preview application from the data warehouse 202. The local runtime components may also include without limitation a data-application binder for binding local (e.g., from local data store 211, which may physically reside in the local computing system or be readily accessible in a local area network) and remote data (e.g., accessible from other WAN-connected systems) to expressions of the preview application, text transfer logic (e.g., drag and drop logic, cut/copy and paste logic), and/or search logic providing a client-side interface for search queries and results.

The data warehouse 202 also includes one or more processors 212, one or more user and communication interfaces 214 (e.g., a display interface, keyboard/mouse interface, touch screen interface, a wireless or wired network interface, etc.), and its own local storage 215 (e.g., local RAM or flash memory, magnetic storage, a solid state drive, etc.). In addition, the data warehouse 202 includes one or more runtime components (e.g., data feed behavior manager 220) for providing customizable analytic and visual behavior to a data feed. In one implementation, the data feed behavior manager 220 receives sample data, business logic and user interfaces associated with a selected data feed and forwards them to a requesting client (e.g., the local computing system 200) as a preview application. The runtime components may also include without limitation a discovery service manager 218 for indexing text in business logic and user interface expressions and for processing discovery (e.g., search) requests against such indices, an expression engine 216 for evaluating business logic and user interface expressions, and a data-application binder for binding local (e.g., from local data store 221, which may reside in the data warehouse 202 and remote data (e.g., accessible from other WAN-connected systems) to expressions when preparing the preview application.

FIG. 3 illustrates an example BI document 300 specifying a directed acyclic graph (DAG) of connected entities 302, 304, 306, 309, 312, and 314). The BI document 300 is associated with a particular data feed and specifies the data, business logic, and user interfaces for use in a preview application. Data and business logic may be designated for local evaluation (e.g., at the data warehouse that prepares and sends the preview application or at the local computing system that receives the preview application) or remote evaluation (e.g., at another specified remote system). Each entity is characterized by zero or more inputs (such as input 308), zero or more outputs (such as output 310), and a specified set of expressions (e.g., transforms) that can receive an input from another entity and/or create a collection for output to another entity.

Each entity can represent without limitation a data structure (e.g., a table or a hierarchical table), a terminal entity (e.g., a visualization or update service), a set of expressions with its bindings to identified data, an external data source (e.g., a remote data source, a query-able data source, a non-query-able data source, a control element that provides user interaction to allow data input, a remote service, etc.), and external event sources (e.g., timers). Each entity also defines the format of its one or more inputs and/or outputs. If the entity has an input, the entity further defines the source of the input data. The one or more expressions specified by each entity define transforms to be performed by the entity on its inputs (if any), the result of which is the output (if any) of the entity.

Individual entities may be characterized in a variety of ways, as described with regard to the example list below:

An equation set is represented as an entity having one or more inputs receiving data for computations and having one or more outputs for supplying the results of the computation to a subsequent entity in the directed graph, wherein the expressions specified by the entity represent the computations made on the input data to generate the output data.

An invariable data source may be represented as an entity with no inputs and an output capable of supplying data to a subsequently connected entity.

An external event source is also represented as an entity with no inputs and an output supplying the data resulting from an event (e.g., a timer event indicating that a timer identifies a current date or time, a user input event indicating that a user has entered the number '3'). An external event source is distinguished from an invariable data source because its output may change based on the state of the particular event.

A visualization is represented as an entity with inputs but no outputs (e.g., a terminal entity). A bar chart visualization, for example, may be represented as an entity having one input supplying its title and another input receiving a collection of pairs of categories and values.

An interactive control element may be specified by associating a visualization entity with an external data source entity representing a control element source entity. The control element source entity has no inputs and an output that supplies values corresponding to the user's manipulation of a displayed control element. By manipulating the associated control element (e.g., moving a slider in a single slider control element), the user causes data to be emitted from the output of control element source entity, which can then be connected to the input of a visualization entity to cause the slider movement to be presented visually to the user. An output of the control source entity would commonly also be input to an equation set, for example, to influence associated computations and potentially other visualizations, although other connections are also contemplated.

An updateable source/sink may also be specified by a pair of entities—a "source" entity, which accepts queries as inputs and emits query results as outputs and a "sink" entity representing a destination to which the query results (e.g., "updates") are output. In this manner, the entities represent in combination a single updatable data source/sink that is similar to the invariable data source but which reflects data changes based on changes in underlying data and the queries it receives.

It should be understood that other types of entities and connections are also contemplated in other implementations. In particular, multiple entities may be connected in a pipeline to produce a complex and arbitrary sequence of expressions designated for local and/or remote computation.

As data that is input to an entity changes, the expression engine re-evaluates the expressions specified by the entity. Accordingly, data changes and re-computation results can ripple through the directed graph, changing the output data that is altered by the re-computations and leaving the outputs of other entities unchanged (where the initial data changes do not ripple to these entities). This incremental change provides a spreadsheet-like recalculation ("recalc") effect—some data changes in the spreadsheet when data is changed, while other data remains unchanged.

Turning back to FIG. 3, the entity 302 represents an invariable data source, having one output but no input, and the entity 304 represents an event source, also having one output but no input, and further having output data that depends on the state of an event. Both the invariable data source entity 302 and the event source entity 304 supply their outputs to an internal equation set entity 306, which specifies one or more expressions for transforming the received data to output data of the entity 306. In this example, the expressions of the internal equation set entity 306 specify local computation and data, not remote computation and data. In contrast, another equation set entity, i.e., external equation set entity 314, specifies one or more expressions designating an external data source. As such, the expressions specified by the entity 314 are communicated to the designated external (e.g., remote) data source for remote computation on remote data. The solutions generated by the remote computation are communicated back to the local computing system for binding to the entity graph.

A control element source entity 312 also has no input and one output. The output data of the control element source entity 312 changes based on the state of an associated control element (e.g., a visual slider control), which can be manipulated by a user. For example, the associated control element may be presented to the user as a slider that the user can slide back and forth within a predetermined range to change the output value of the entity 312. A control element source entity 318 is also connected to the input of a visualization entity 309.

As illustrated, individual entities may be connected into a pipeline, where the local or remote location of the data and the computation for one entity are immaterial to any previous or subsequent entity in the pipeline. For example, an output of the invariable data source entity 302 is connected to the external equation set entity 314 and an output connected to the internal equation set entity 306. The external equation set entity 314 has one output connected to an input of the internal equation set entity 306. It should be understood that the input and output formats of connected entities are compatible to allow a first entity to output data directly to a second entity.

Further, among other connections, inputs to the internal equation set entity 306 are connected to outputs of the invariable data source entity 302, the event source entity 304, and the control element source entity 312. Also, as shown, outputs of the entities 306, 314 and 318 are input to the visualization entity 309, which has three inputs and no outputs. The visualization entity 309 alters a visualization presented to the user based on the data received at its inputs from the entities 306, 314, and 318. In this manner, changes to the outputs of the entities 306, 314, and 318 results in changes to the visual display viewed by user.

Figure 4:
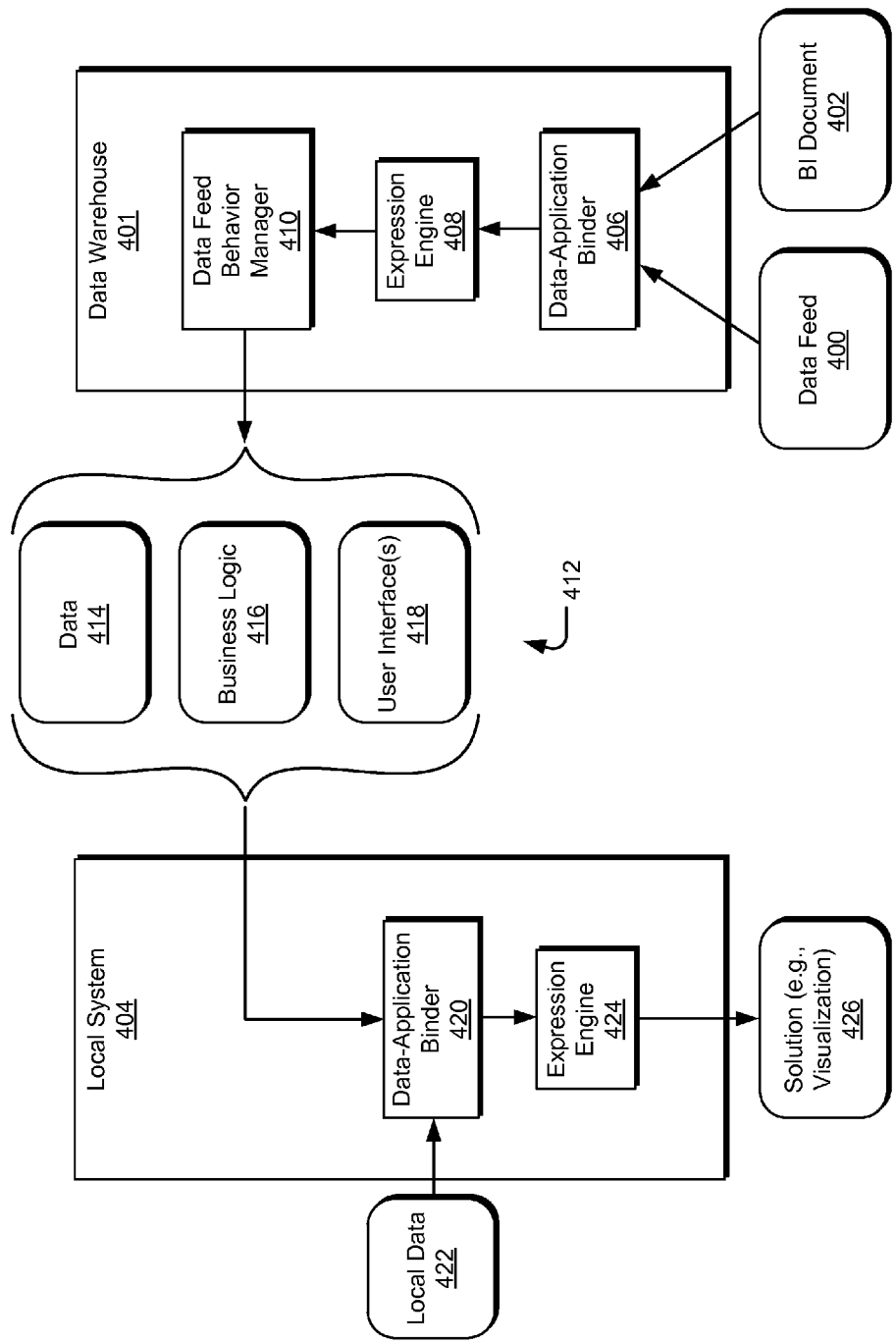
FIG. 4 illustrates an example data feed having customizable analytic and visual behavior.

FIG. 4 illustrates an example data feed 400 having customizable analytic and visual behavior. The data feed 400 is made available by a data warehouse 401, typically through a discovery process. The data feed's behavior is defined by a BI document 402, which in one implementation stores a representation of an entity graph although other representations may be employed. Responsive to selection of the data feed by a local client system 404 (e.g., via a data feed behavior manager 410), the data warehouse 401 inputs the data feed 400 and the BI document 406, which binds sample data from the data feed 400 to the expressions (or a subset of the expressions) recorded in the BI document 402. An expression engine 408 evaluates the expressions based on the available data and passes the expressions (e.g., evaluated or partially evaluated) to the data feed behavior manager 410.

The data feed behavior manager 410 receives the sample data, business logic and user interfaces from the expression engine 408 and forwards them in a preview application 412 to the requesting local system 404. In one implementation, the preview application 412 includes individual expressions and data representing the sample data 414, business logic 416, and user interfaces 418 for the preview. In another implementation, the data feed behavior manager 410 forwards the BI document 402 to the local system 404 as a preview application. In yet another implementation, the data feed behavior manager 410 generates a new BI document that includes representations of and/or references to the sample data, business logic, and user interfaces and forwards it to the local system 404 as a preview application. Other configurations and formats for the preview application are also contemplated.

The local system 404 receives the preview application 412, sending it to a data-application binder 420, which binds local data 422 and any other available data (e.g., local or remote solution data) to the expressions in the preview application 412. A local expression engine 424 evaluates the expressions in light of the bound data and outputs a solution 426 (e.g., a visualization). It should also be understood that the expressions in the preview application 412 may be evaluated locally or remotely, based on references associated with individual entities specified in the preview application 412.

Figure 5:
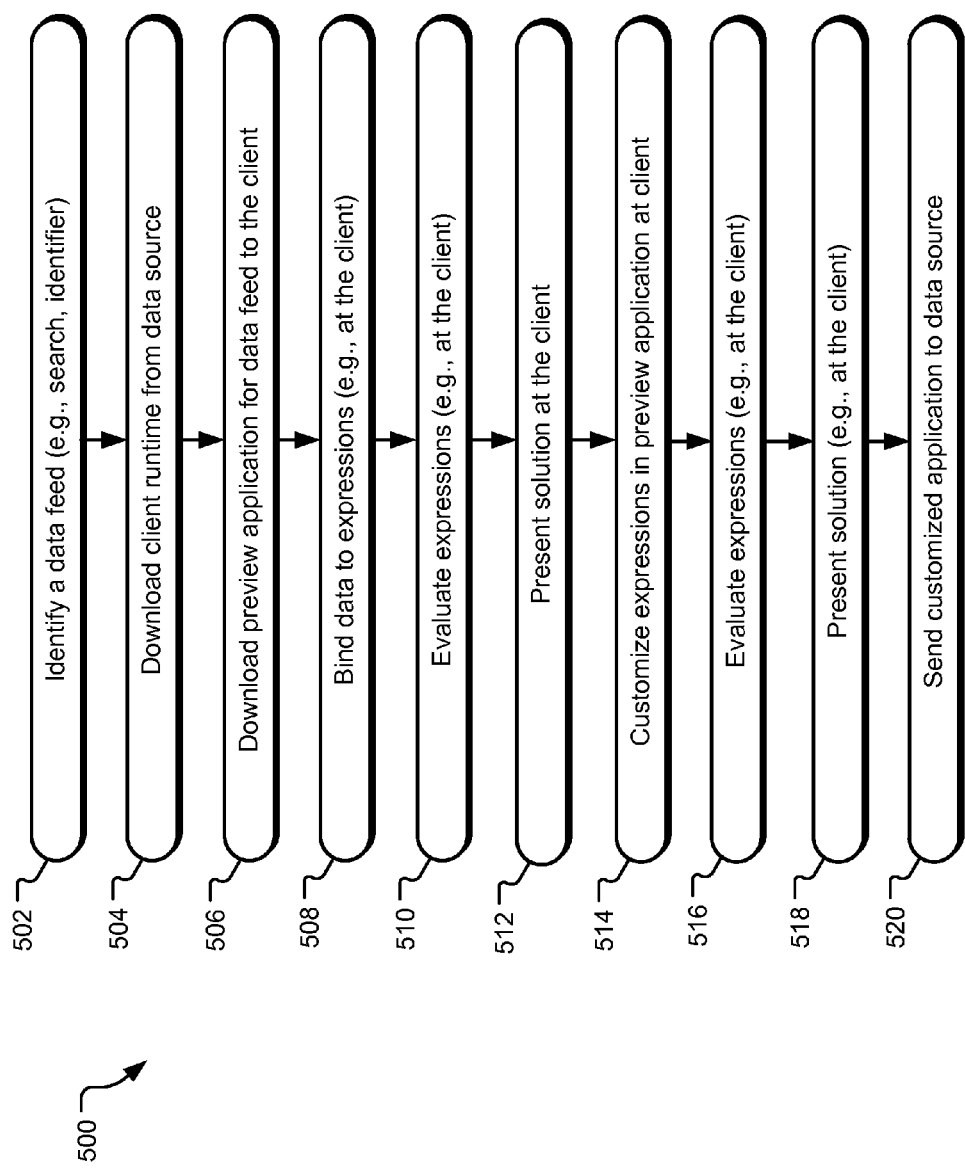
FIG. 5 illustrates example operations for processing an example data feed at a client.

FIG. 5 illustrates example operations 500 for processing an example data feed at a client. An identification operation 502 identifies a data feed of interest through a discovery process (e.g., using a search feature that interacts with an index maintained by a data source, using a specific identifier, via browsing through a directory of data feeds provided by a data source). Accordingly, the discovery process provided by the identification operation 502 assists a user in identifying a data feed that may be relevant to a particular domain of interest. For example, if the user submits a discovery request specifying "consumer expenditures Seattle," the identification operation 502 can search an index of one or more data feeds to identify data feeds satisfying the discovery request. Such data feeds are likely to provide relevant data to the specified business intelligence objective.

A download operating 504 downloads and executes a client-based runtime component capable of binding data to expressions and evaluating expressions to produce solutions. The runtime component may also provide discovery (e.g., a search interface), cut/copy and paste, and/or drag and drop capabilities for the client. If the runtime component is already resident at the client, downloading the runtime component may be bypassed.

Another downloading operation 506 downloads to the client a preview application associated with the data feed of interest. The preview application includes sample data, business logic, and one or more user interfaces for the data feed. A binding operation 508 binds available data to the expressions at the client. An evaluation operation 510 evaluates the expressions (e.g., at the client or a remote system), and a presentation operation 512 presents the resulting solution at the client (e.g., via a visualization). As previously mentioned, it should be understood that certain specified data and expressions may not be available locally or certain data and expressions may be designated for evaluation at a remote data source. For such data and expressions, the binding operations 508 and the evaluation operation 510 may be offloaded to a remote system for execution.

A customization operation 514, another evaluation operation 516, and another presentation operation 518 may also be executed. The preview application includes controls (e.g., a link, a button, etc.) through which a user can access a customization mode. The customization mode allows a user to modify expressions and data of the preview application. In one such mode, a customization user interface feature (such as control element 804 in FIG. 8) is presented to the user to capture new or amended expressions and data, bind them with the existing expressions and data, and re-evaluate the expressions to produce a customized solution. After customization, the client can save the modified version of the preview application for future use. A transmission operation 520 can also send the customized version of the preview application back to the data source, which may store the application and make it available to other users in association with the data feed.

Figure 6:
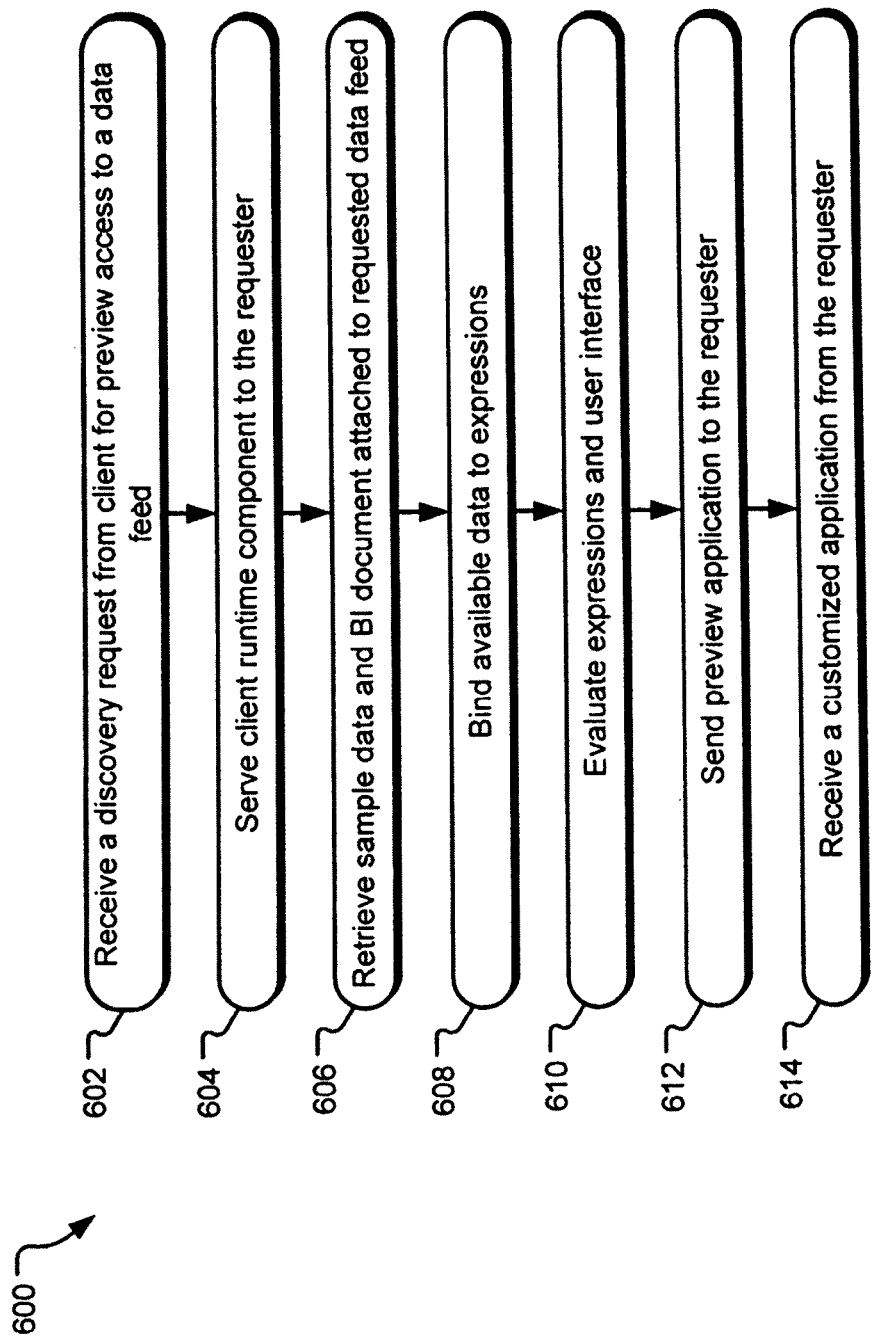
FIG. 6 illustrates example operations for processing an example data feed at a data warehouse.

FIG. 6 illustrates example operations 600 for processing an example data feed at a data warehouse. A receiving operation 602 receives a discovery request from a requester (e.g., a client) for preview access to a data feed offered by a data source. Such a discovery request may include a data feed identifier, search terms, and other properties characterizing the domain of the sample data, business logic, and user interfaces of interest. The discovery request can be applied to indices of one or more data feeds to see if any of the data feeds are associated with expressions that can satisfy the discovery request. If so, such data feeds can be identified to the requester in discovery results. The requester can then select one or more of the identified data feeds for a preview. A serving operation 604 sends a client runtime component to the requester, although if the requester already has the client runtime resident, then this operation may be bypassed.

A retrieval operation 606 retrieves the sample data and BI document associated with the requested data feed. The BI document, or a portion thereof, specifies the expressions and data of the preview application, such as through an entity graph representation. A binding operation 608 binds the available data to the expressions specified in the BI document, and an evaluation operation 610 evaluates the expressions to the extent possible based on the available data. A preview operation 612 sends the resulting preview application to the requesting client. A receiving operation 614 can also receive a customized version of the application from the requester for possible storage by the data source, which may make the customized application available to other requesters in the future.

Figure 7:
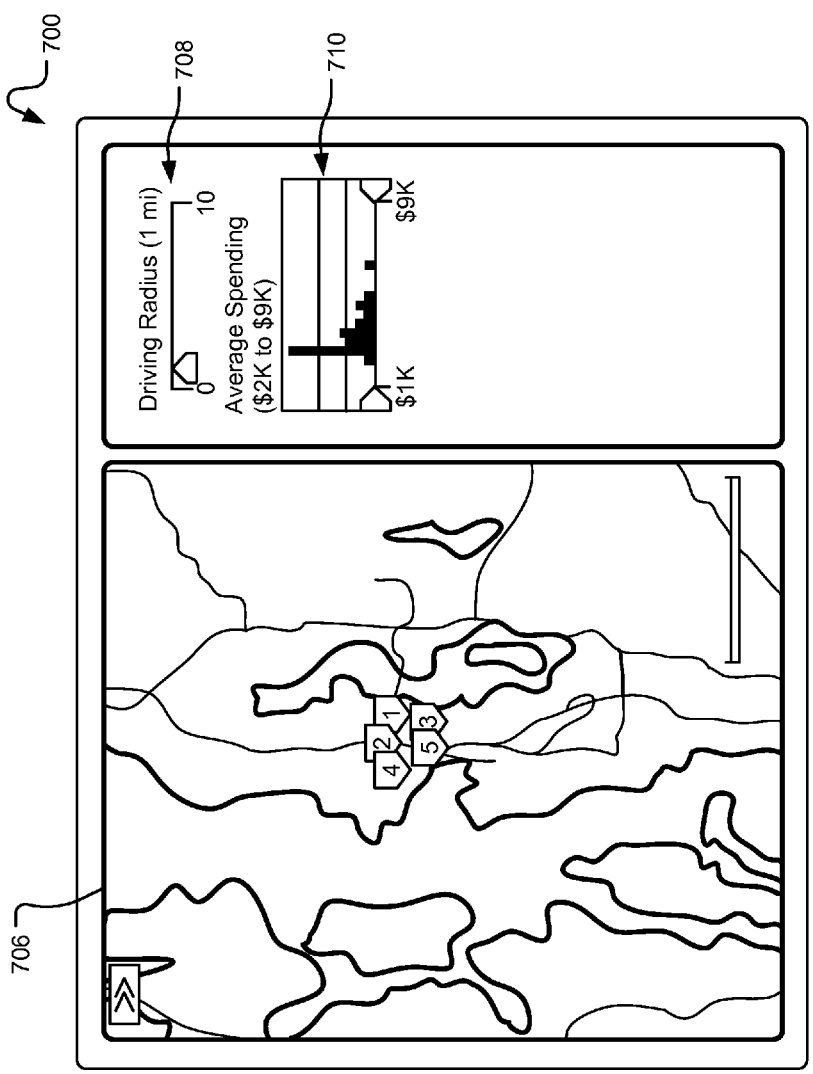
FIG. 7 illustrates example visuals of a preview application associated with a data feed.

FIG. 7 illustrates example visuals 700 of a preview application associated with a data feed. In some cases, such as the map visual 706, map data is combined with solution data (e.g., the symbols marked "1", "2", "3", "4", and "5" on the map). The solution data results from underlying input data, transformations, and other input values configured through user interaction with the single slider control element 708 and the range control 710.

Figure 8:
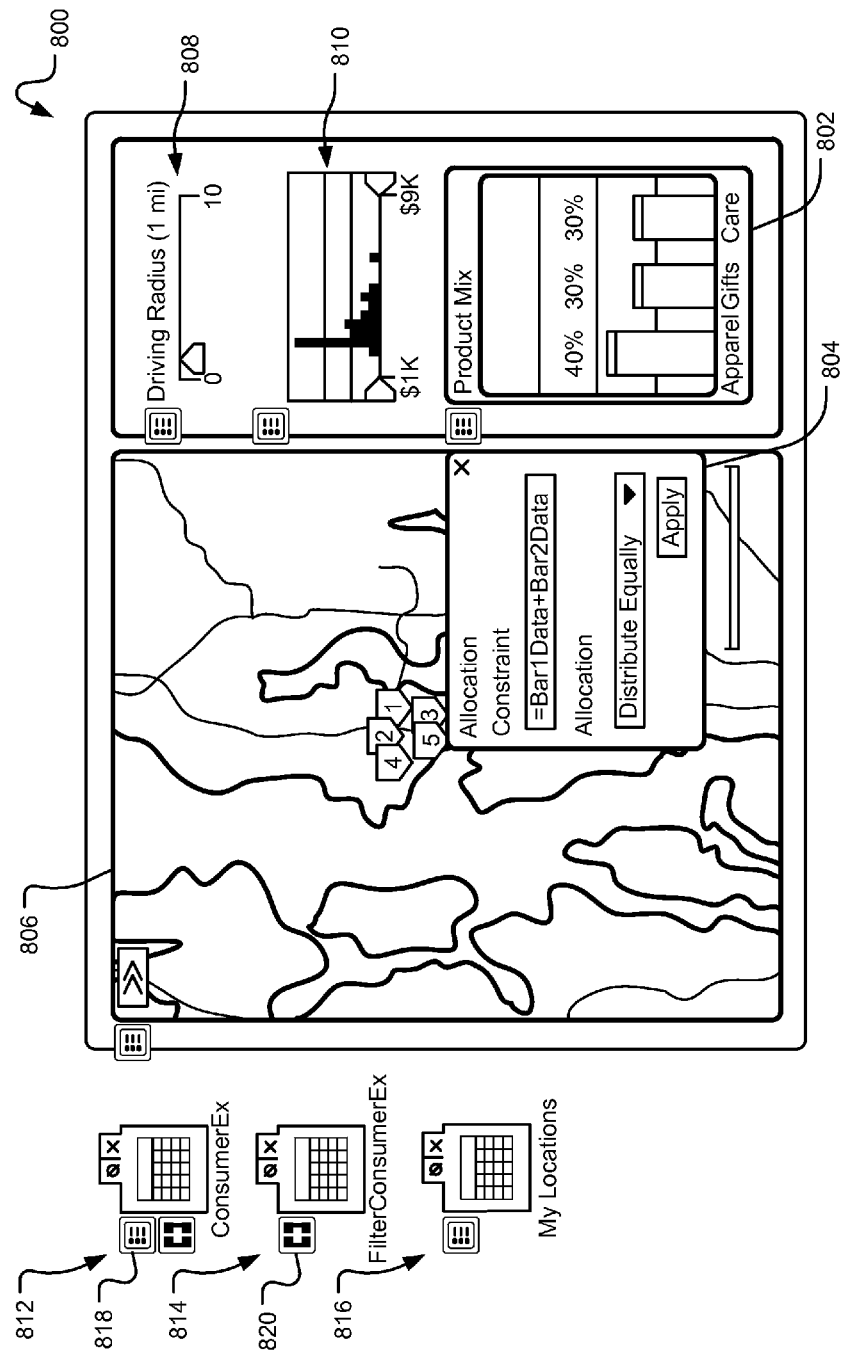
FIG. 8 illustrates example customizable analytic and visual behavior attached to a data feed.

FIG. 8 illustrates example customizable analytic and visual behavior attached to a data feed. Each visual represented by a terminal entity in a graph associated with a BI document presents a user with a view of input data and solutions resulting from associated transformations. In some cases, such as the map visual 806, map data is combined with solution data (e.g., the symbols marked "1", "2", "3", "4", and "5" on the map). The solution data results from underlying input data, transformations, and other input values configured through user interaction with the single slider control element 808 and the range control 810.

The new histogram visual element 802 is also based on input data and transformations, some of which are defined by a user through the control element 804. In the case of the control element 804, a user can configure a "constraint" transformation using a user-entered equation and an "allocation" transformation using a drop down box offering various selections (e.g., "Distribute Equally," "Weighted," etc.) Other transformations may also be applied to the input data in the configuration of the histogram visual 802 or any other visual element.

Other application controls are also shown in FIG. 8. The controls 812, 814, and 816 represent data source entities in a graph of entities. By selecting a data grid control, such as data grid control 818, a user can access the underlying input data of an associated data source. By selecting a logic control, such as logic control 820, a user can access the underlying business logic (e.g., transformations) applicable to the underlying input data.

Figure 9:
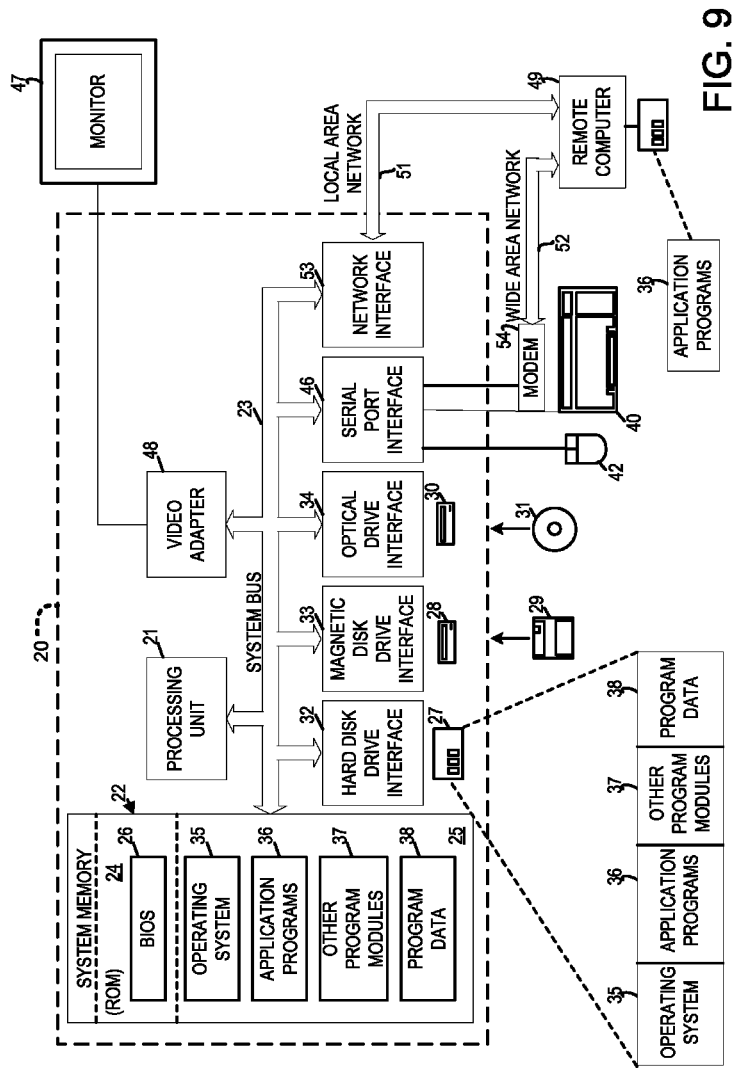
FIG. 9 illustrates an example system that may be useful in implementing the described technology.

FIG. 9 illustrates an example system that may be useful in implementing the described technology. The example hardware and operating environment of FIG. 9 for implementing the described technology includes a computing device, such as general purpose computing device in the form of a gaming console or computer 20, a mobile telephone, a personal data assistant (PDA), a set top box, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, a DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 9. The logical connections depicted in FIG. 9 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an expression engine, a data feed behavior manager, a discover services manager, and other modules and services may be embodied by instructions stored in memory 22 and/or storage devices 29 or 31 and processed by the processing unit 21. Source data, BI documents, preview applications, expressions, and other data may be stored in memory 22 and/or storage devices 29 or 31 as persistent datastores. Further, local computing systems, remote data sources and/or services, and other associated logic represent hardware and/or software configured to provide BI functionality for network-connected systems. Such services may be implemented using a general purpose computer and specialized software (such as a server executing service software), a special purpose computing system and specialized software (such as a mobile device or network appliance executing service software), or other computing configurations.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
receiving a discovery request from a requester, the discovery request specifying a domain of interest;
identifying a plurality of data feeds based on the discovery request, the plurality of data feeds being associated with a plurality of expressions satisfying the discovery request, wherein each of the identified data feed offers a preview application represented by a customizable sample visualization;
providing the identified data feeds to the requester;
receiving, from the requester, a selection of a data feed of interest, the selected data feed being one of the identified data feeds, wherein access to domain-specific data associated with each of the identified data feed is conditioned upon purchase of access and access to domain-specific sample data associated with each of the identified data feed is not conditioned upon purchase of access;

responsive to the selection of the data feed, retrieving the domain-specific sample data and one or more expressions associated with the selected data feed;

preparing a preview application by evaluating the one or more expressions using the retrieved domain-specific sample data; and transmitting to the requester the preview application associated with the selected data feed, the preview application providing domain-specific business logic and one or more domain-specific user interfaces in conjunction with the domain-specific sample data representative of the selected data feed, wherein a different preview application is prepared and transmitted based on selection of a different data feed.

2. The method of claim 1 wherein the domain of interest is represented by one or more search terms and the identifying operation comprises:

searching for the search terms in an index of terms included in expressions associated with the data feeds to identify the data feed.

3. The method of claim 1 wherein the preview application includes the one or more expressions, the one or more expressions, on evaluation at a requestor device, defining a control element, the control element providing requester access to modify the domain-specific business logic, the one or more domain-specific user interfaces, and the domain-specific data to yield a customized domain-specific application.

4. The method of claim 1 wherein the preview application includes one or more expressions defining a control element, the control element providing requester access to save one or more modifications to at least one of the domain-specific business logic, the one or more domain-specific user interfaces, and the domain-specific data in a customized domain-specific application.

5. The method of claim 1 wherein the transmitting operation is performed by a data source and the preview application includes one or more expressions defining a control element, the control element providing requester access to return a customized domain specific application for storage by the data source, wherein the customized domain specific application is a modified version of the preview application.

6. The method of claim 1 wherein the preview application specifies the one of more expressions of the identified data feed and supports transfer of at least one of the one or more expressions to another application by the requester.

7. The method of claim 6 wherein the transfer of at least one of the expressions to another application is accomplished by a textual cut or copy and paste operation.

8. The method of claim 6 wherein the transfer of at least one of the expressions to another application is accomplished by a drag and drop operation.

9. An article of manufacture comprising one or more computer-readable storage media storing computer executable instructions for executing on a computer system a computer process, the computer process comprising:

receiving a discovery request from a requester, the discovery request specifying a domain of interest;

identifying a plurality of data feeds based on the discovery request, the plurality of data feeds being associated with expressions satisfying the discovery request;

providing the identified data feeds to the requester, receiving, from the requester, a selection of a data feed of interest, the selected data feed being one of the identified data feeds, wherein access to each of the identified data feed is conditioned upon prior access purchase, the selection of the data feed presenting a preview application to preview domain-specific sample data associated with the selected data feed; and downloading to the requester the preview application associated with the selected data feed in response to receiving a selection of the preview application, the preview application providing domain-specific business logic, one or more domain-specific user interfaces, and the domain-specific sample data representative of the selected data feed, wherein the preview application in combination with local data associated with the requestor provides an interactive preview of the domain-specific sample data before purchasing access to the domain-specific data which is conditioned upon prior access purchase.

10. The one or more computer-readable storage media of claim 9 wherein the domain of interest is represented by one or more search terms and the identifying operation comprises:

searching for the search terms in an index of terms included in expressions associated with the data feeds to identify the data feed.

11. The one or more computer-readable storage media of claim 9 wherein the preview application includes one or more expressions defining a control element, the control element providing requester access to modify the domain-specific business logic, the one or more domain-specific user interfaces, and the domain-specific data to yield a customized domain specific application, wherein the customized domain specific application is received from the requester and the customized domain specific application is made available to other requesters in future, wherein the customized domain specific application is yielded by capturing new expressions and new data from the requester, binding the new expressions and the new data with existing expressions and data of the preview application, and evaluating the bounded expressions.

12. The one or more computer-readable storage media of claim 9 wherein the preview application includes one or more expressions defining a control element, the control element providing requester access to save one or more modifications to at least one of the domain specific business logic, the one or more domain-specific user interfaces, and the domain-specific data in a customized domain-specific application.

13. The one or more computer-readable storage media of claim 9 wherein the transmitting operation is performed by a data source and the preview application includes one or more expressions defining a control element, the control element providing requester access to return a customized domain-specific application for storage by the data source, wherein the customized domain specific application is a modified version of the preview application.

14. The one or more computer-readable storage media of claim 9 wherein the preview application specifies one of more of the expressions of the identified data feed and supports transfer of at least one of the expressions to another application by the requester.

15. The one or more computer-readable storage media of claim 14 wherein the transfer of at least one of the expressions to another application is accomplished by a textual cut or copy and paste operation.

16. The one or more computer-readable storage media of claim 14 wherein the transfer of at least one of the expressions to another application is accomplished by a drag and drop operation.

17. A system comprising:

one or more processors coupled to one or more memories;

a discovery manager identifying a data feed from a plurality of data feeds satisfying a discovery request from a requester, the identified data feed being one of the plurality of data feeds and associated with expressions defining behaviour of the identified data feed, wherein access to the identified data is conditioned upon prior access purchase, the discovery request specifying a domain of interest; and a data feed behaviour manager receiving domain-specific sample data, domain specific business logic and one or more domain-specific user interfaces associated with only the identified data feed, preparing a preview application based on the receiving, and transmitting to the requester the preview application in response to receiving a selection of the identified data feed from the requester, the preview application being represented by the domain specific business logic, the one or more domain-specific user interfaces, and the domain-specific sample data as a representative of the identified data feed, the preview application providing interactive preview of the domain-specific sample data by interacting with the domain specific business logic and the domain-specific sample data before purchasing access to the identified data feed.

18. The system of claim 17 wherein the domain of interest is represented by one or more search terms and the discovery manager searches for the search terms in an index of terms included in expressions associated with the data feeds to identify the data feed.

19. The system of claim 17 wherein the preview application includes one or more expressions defining a control element, the control element providing requester access to modify the domain-specific business logic, the one or more domain-specific user interfaces, and the domain-specific data to yield a customized domain-specific application, wherein the one or more expressions are bound with the domain-specific sample data when the preview application is prepared.

20. The system of claim 17 wherein the preview application specifies one of more of the expressions of the identified data feed and supports transfer of at least one of the expressions to another application by the requester.

* * * * *